US012515570B2

United States Patent
Schmidt et al.

(10) Patent No.: US 12,515,570 B2
(45) Date of Patent: Jan. 6, 2026

(54) HEADREST FOR A VEHICLE SEAT AND MOTOR VEHICLE HAVING A VEHICLE SEAT AND A HEADREST

(71) Applicant: Mercedes-Benz Group AG, Stuttgart (DE)

(72) Inventors: Bernd Schmidt, Wildberg (DE); Volker Sautter, Herrenberg (DE); Hans Ziesing, Herrenberg (DE)

(73) Assignee: Mercedes-Benz Group AG, Stuttgart (DE)

( * ) Notice: Subject to any disclaimer, the term of this patent is extended or adjusted under 35 U.S.C. 154(b) by 117 days.

(21) Appl. No.: 18/263,021

(22) PCT Filed: Dec. 6, 2021

(86) PCT No.: PCT/EP2021/084458
§ 371 (c)(1),
(2) Date: Jul. 26, 2023

(87) PCT Pub. No.: WO2022/167124
PCT Pub. Date: Aug. 11, 2022

(65) Prior Publication Data
US 2024/0067069 A1   Feb. 29, 2024

(30) Foreign Application Priority Data
Feb. 5, 2021   (DE) .................... 10 2021 000 601.1

(51) Int. Cl.
*A47C 1/10*   (2006.01)
*B60N 2/829*   (2018.01)
(Continued)

(52) U.S. Cl.
CPC ............. *B60N 2/888* (2018.02); *B60N 2/853* (2018.02); *B60N 2/879* (2018.02); *B60N 2/976* (2018.02)

(58) Field of Classification Search
CPC ........ B60N 2/885; B60N 2/806; B60N 2/888; B60N 2205/30; B60N 2/80
See application file for complete search history.

(56) References Cited

U.S. PATENT DOCUMENTS

| 4,345,347 A | * | 8/1982 | Kantor | ................... A47C 7/383 5/636 |
| 4,738,488 A | * | 4/1988 | Camelio | ................ B60N 2/882 5/636 |

(Continued)

FOREIGN PATENT DOCUMENTS

| CN | 106965721 A | 7/2017 |
| CN | 107272820 A | 10/2017 |

(Continued)

OTHER PUBLICATIONS

PCT/EP2021/084458, International Search Report dated Feb. 28, 2022 (Three (3) pages).

(Continued)

*Primary Examiner* — Shin H Kim
(74) *Attorney, Agent, or Firm* — Crowell & Moring LLP

(57) ABSTRACT

A headrest for a vehicle seat includes an upholstered support surface for supporting an occupant's head and a neck rest. The neck rest is pivotable between a flat position and an angled position by a friction hinge such that an end region of the neck rest forms a part of the upholstered support surface in the flat position and the end region of the neck rest stands angled in relation to the upholstered support surface and delimits the upholstered support surface in the angled position.

10 Claims, 3 Drawing Sheets

(51) Int. Cl.
*B60N 2/853* (2018.01)
*B60N 2/865* (2018.01)
*B60N 2/879* (2018.01)
*B60N 2/888* (2018.01)
*B60N 2/90* (2018.01)

(56) References Cited

U.S. PATENT DOCUMENTS

| | | | | |
|---|---|---|---|---|
| 5,205,611 | A * | 4/1993 | Stephens | A47C 7/383 |
| | | | | 5/636 |
| 5,330,255 | A * | 7/1994 | Stawicki | B60N 2/914 |
| | | | | 297/391 |
| 5,544,378 | A * | 8/1996 | Chow | A47C 7/383 |
| | | | | 5/640 |
| 6,158,812 | A * | 12/2000 | Bonke | B60N 2/818 |
| | | | | 297/216.12 |
| 7,040,705 | B2 * | 5/2006 | Clough | A47C 7/383 |
| | | | | 297/391 |
| 7,410,218 | B2 * | 8/2008 | Kotani | B60N 2/885 |
| | | | | 297/391 |
| 7,559,608 | B2 * | 7/2009 | Miyahara | B60N 2/847 |
| | | | | 297/378.12 |
| RE44,432 | E * | 8/2013 | Bartels | B60N 2/888 |
| | | | | 297/216.12 |
| 10,703,242 | B2 * | 7/2020 | Spackman | B60N 2/847 |
| 10,843,607 | B2 * | 11/2020 | Kondo | B60N 2/829 |
| 11,518,285 | B2 * | 12/2022 | Carles | B60N 2/58 |
| 11,759,029 | B2 * | 9/2023 | Beeftink | B60N 2/7005 |
| | | | | 5/655 |
| 12,145,488 | B2 * | 11/2024 | Kato | B60N 2/80 |
| 2001/0054837 | A1 * | 12/2001 | O'Connor | B60N 2/2872 |
| | | | | 297/397 |
| 2004/0195893 | A1 * | 10/2004 | Clough | A47C 7/38 |
| | | | | 297/391 |
| 2005/0179299 | A1 * | 8/2005 | Yetukuri | B60N 2/80 |
| | | | | 297/391 |
| 2005/0253440 | A1 * | 11/2005 | Kotani | B60N 2/885 |
| | | | | 297/410 |
| 2006/0163919 | A1 | 7/2006 | Thiel et al. | |
| 2014/0077565 | A1 * | 3/2014 | Baumgarten | B60N 2/885 |
| | | | | 297/404 |
| 2017/0113581 | A1 * | 4/2017 | Mussi | B60N 2/806 |
| 2017/0197530 | A1 * | 7/2017 | Line | B60N 2/809 |
| 2017/0293281 | A1 * | 10/2017 | Li | A47C 1/0242 |
| 2019/0359105 | A1 | 11/2019 | Kondo et al. | |
| 2020/0139851 | A1 | 5/2020 | Oshima et al. | |
| 2020/0215949 | A1 * | 7/2020 | Carles | B60N 2/806 |
| 2020/0241497 | A1 * | 7/2020 | Li | A47C 7/506 |
| 2020/0346758 | A1 * | 11/2020 | Parrilla Calle | B60N 2/856 |
| 2022/0063469 | A1 * | 3/2022 | Clough | B60N 2/824 |
| 2023/0191973 | A1 * | 6/2023 | Migneco | B60N 2/976 |
| | | | | 601/148 |
| 2024/0067069 | A1 * | 2/2024 | Schmidt | B60N 2/888 |

FOREIGN PATENT DOCUMENTS

| | | |
|---|---|---|
| CN | 110539675 A | 12/2019 |
| CN | 210390882 U | 4/2020 |
| CN | 111391732 A | 7/2020 |
| DE | 10 2004 055 986 B4 | 6/2006 |
| DE | 10 2005 030 258 A1 | 1/2007 |
| DE | 10 2010 056 198 A1 | 8/2011 |
| DE | 10 2010 055 596 A1 | 6/2012 |
| DE | 10 2012 006 071 A1 | 11/2012 |
| DE | 10 2012 015 390 A1 | 2/2014 |
| FR | 2 876 327 A1 | 4/2006 |
| JP | 2006-224868 A | 8/2006 |
| WO | WO 2011/122769 A2 | 10/2011 |

OTHER PUBLICATIONS

German-language German Office Action issued in German application No. 10 2021 000 601.1 dated Sep. 24, 2021 (Six (6) pages).
German-language German Office Action issued in German Application No. 10 2021 000 601.1 dated Oct. 31, 2023, with English machine translation (14 pages).
Chinese-language Office Action issued in Chinese Application No. 202180090946.X dated Jul. 12, 2025 (7 pages).

* cited by examiner

HEADREST FOR A VEHICLE SEAT AND MOTOR VEHICLE HAVING A VEHICLE SEAT AND A HEADREST

BACKGROUND AND SUMMARY OF THE INVENTION

The invention relates to a headrest for a vehicle seat. The invention further relates to a motor vehicle having a vehicle seat and a headrest.

A vehicle seat for a motor vehicle that can in particular be designed as a passenger car often has a headrest that is generally displaceably installed on a backrest of the vehicle seat. The headrest serves to support a head of a vehicle occupant, and thus an occupant's head. Via the headrest, a particularly comfortable position can be taken up by the occupant in the vehicle on the one hand, and on the other, in the event of an impact a risk of injury, for example to a neck of the occupant, can be reduced by supporting the head.

In the prior art, vehicle seats additionally exist that have a neck rest in addition to the headrest, e.g., as shown in DE 10 2005 030 258 A1. Actuator-driven neck rests in the form of a drawer are further known from the prior art.

Disadvantages in the prior art are a lack of comfort when operating and/or using the neck rest and a possible risk of injury from protruding neck rests.

It is thus an object of the present invention to provide a headrest for a vehicle seat and a corresponding motor vehicle that have a neck rest that is particularly easy to operate and comfortable to use.

A first aspect of the invention relates to a headrest. The headrest according to the invention for a vehicle seat comprises an upholstered support surface that serves to support an occupant's head. The vehicle seat is in particular a motor vehicle seat for a motor vehicle, which is designed for example as a passenger car. The headrest is advantageously fixed height-adjustably to a backrest of the vehicle seat. The support surface is designed such that it is upholstered and the headrest additionally advantageously has a cushion. The occupant's head is the head of an occupant or user of the vehicle who can rest their head on the support surface, for example to relax. In an intended position or usage position of the vehicle seat, and thus of the headrest in the motor vehicle, the vehicle seat is orientated such that the occupant sits in the vehicle and the backrest is not folded back to recline. In this intended position, the support surface is oriented substantially perpendicularly, such that in particular a region on the back of the occupant's head can be supported on the support surface for example against acceleration forces of the motor vehicle along the longitudinal direction of the vehicle. The headrest further comprises a neck rest.

So that the neck rest can be particularly advantageously operated and used by the occupant, it is provided according to the invention that the neck rest can be pivoted between a flat position and an angled position by means of at least one friction hinge, wherein an end region of the neck rest forms a part of the support surface in the flat position and the end region of the neck rest stands angled in relation to the support surface and delimits the support surface in the angled position. The end region in particular stands angled to the support surface such that the end region points in the direction of a neck if the vehicle occupant sits on the vehicle seat as intended. The end region can transition into the support surface, in particular seamlessly, as the end region delimits the, in particular now reduced, support surface in the angled position.

In the flat position, the end region serves as part of the support surface, in particular for supporting the occupant's head. In the angled position, the angled protrusion of the end region of the neck rest enables the end region to be advantageously designed to support a neck region or neck that is attached to the occupant's head and/or shoulder region of the occupant. In the usage position or in a mounted state of the headrest, the end region of the neck rest is in the flat position of the lower region of the support surface. In the angled position, the end region thus delimits the support surface at the bottom. The end region of the neck rest can also be described as a folding wing and as a whole forms a folding wing of the headrest.

The friction hinge is a mechanical component that serves to move the neck rest between the angled position and the flat position via an external torque and, in the respective position, or alternatively in an interim position, to independently keep the neck rest in the respective position. The functional principle of the friction hinge, which can also be described as a torque hinge, is based on friction. For example, a breakaway torque and/or a movement torque can correspond to a dynamic torque that enables a comfortable, jolt-free movement of the neck rest for the occupant or the user. The pivot into or out of the angled position can be achieved by the occupant manually pulling forward, for example on the end region.

The headrest with the neck rest resembles a normal headrest in the flat position as a part of the support surface is formed by the neck rest. Whereby the headrest and thus the vehicle seat can for example be designed particularly elegantly. In other words, the lower region of a headrest cushion can be pivoted via a friction hinge, with no optical change being able to be discerned in the folded-back state in relation to the known prior art. The pivot or forward swivel can be achieved by manually pulling forward on a lower cushion edge. Form stability in the respective position is achieved via the resistance of the friction hinge.

The invention thus has the advantage that a sufficient, and in particular individually adjustable neck support for a vehicle occupant is enabled in addition to a good head support. The vehicle seat can be a front seat or a seat in the rear region of the vehicle. The invention thus has the advantage that, in the case of optically identical outer geometry of the headrest, and thus also usability of the headrest, for example when adjusting the height relative to a backrest of the vehicle seat, there is no restriction in comparison with a conventional headrest. The headrest according to the invention additionally offers an additional function and serves as a comfortable and effective neck support for the vehicle occupant. A particularly simple technical solution for the potential displacement or pivoting of the neck support can thus additionally be obtained by using the friction hinge. The neck rest is additionally in functional use in its respective position, and thus both in the flat position and in the angled position. Contrastingly, in the prior art, the neck rest takes up a usage and a non-usage position, with no function being achieved in the latter position.

Additionally, using the friction hinge has the advantage that in the event of an accident, for example via an impact event on the motor vehicle, an extended neck rest can independently fall or travel from the angled position back into the flat position as a result of force. The headrest can thus be used just as safely as a conventional headrest. For this purpose, in an advantageous embodiment of the invention, resistance of the friction hinge is adjusted to the impact event, whereby the neck rest independently pivots into the flat position during the impact event. In other words, in the event of an accident, the neck rest is independently reset, for example due to centrifugal forces and/or further forces, via the resistance, in particular friction resistance of the friction hinge.

In a further advantageous embodiment of the invention, the neck rest comprises a frame element that forms a contour of the end region. In other words, an outer shape of the end region of the neck rest, and thus, in the flat position, an outer shape of the support surface, is formed by a frame or the frame element. The shape of the end region of the neck rest used to support the neck is thus formed by the frame element. The frame element is advantageously covered with a cushion or a cushion element. This thus has the advantage that the shape of the end region can be designed particularly simply, and the frame can in particular be fixed to a part of the friction hinge such that it is fixed against rotation, whereby the frame element can be used by the occupant particularly advantageously when pivoting the neck rest as a grip or grip element.

In a further advantageous embodiment of the invention, the headrest comprises a massage device. The massage device of the headrest or the neck rest can for example cause a massage effect on the head or neck and/or shoulder region of the occupant via a mechanical movement. The headrest can thus advantageously be used particularly comfortably by the occupant, whereby, for example, a journey with the motor vehicle can be carried out particularly comfortably.

In a further advantageous embodiment of the invention, the massage device has a vibrating element. For example, the vibrating element is a motor with a shaft on which a weight is arranged with an imbalance. At least one part in the massage device can thus be set to vibrate, which is transferred to the occupant as a massage effect via the headrest. The vibrating element has the advantage that the massage device is particularly simple, and can thus for example be designed cost-efficiently.

In a further advantageous embodiment of the invention, the massage device has a pneumatic actuator. The pneumatic actuator operates a controlling member, for example, which provides a deformation at least of a partial region of the neck rest, in particular of a partial region of the end region. A massage effect can thus be caused for the occupant. The pneumatic actuator has the advantage that the massage can for example be carried out particularly intensively and/or particularly precisely.

In a further advantageous embodiment of the invention, the massage device is arranged on the neck rest, and there in particular on the end region and most particularly on the frame element. In other words, the region of the headrest that serves to support the neck has a device for massaging the vehicle occupant. By arranging the massage device on the neck rest, and in particular on the end region, it is possible that the massage effect can be caused almost on an edge or on the lower end of the headrest or neck rest. The massage effect can thus extend to the lower neck or upper shoulder region of the occupant, whereby the occupant can be particularly relaxed.

In a further advantageous embodiment of the invention, the headrest has a removable cushion element that can be fixed to the support surface by means of a fastening element. In other words, a cushion element is provided that is designed in particular to be particularly soft and/or smooth, for example to allow the occupant's head to sink into the cushion element particularly well, such that the cushion element can also be described as a cuddly cushion. The fastening element can in particular be designed such that the cushion element can be adjusted relative to the support surface, for example to a size of the occupant. The position of the cushion element can additionally be influenced by pivoting the neck rest. This has the advantage that it is particularly comfortable for the occupant to use the headrest and the efficacy of the neck support can be further increased.

In a further advantageous embodiment of the invention, the cushion element comprises a heating element. In other words, the cushion element has heating that can increase the temperature of at least a part of the cushion element in comparison for example with an environment temperature. As an alternative or in addition, the heating element can also be designed such that it does not serve or does not only serve to heat, but also to cool. In other words, the heating element can also be designed as a temperature regulation element. The interaction of the heating element of the cushion element in combination with pivoting the neck rest has the advantage that a wellbeing or relaxing effect can be increased, as heat transfer in the neck or neck region of the occupant can be carried out in a particularly targeted and particularly effective manner. The heating effect can in particular be conveyed via the end region or the frame element.

A second aspect of the invention relates to a motor vehicle, in particular a passenger car, having a vehicle seat that has a headrest according to the invention. In other words, the vehicle comprises a vehicle seat that in particular has a backrest. The headrest is advantageously fixed to the latter. The headrest of the vehicle seat is for example provided with a headrest cushion designed which can be pivoted via a friction hinge. In a folded-back state, i.e., in a flat position of a lower region or of the neck rest of the headrest, in particular no change can be seen in comparison with a conventional head cushion. In the forward pivoted state of the neck rest, i.e., in the angled position, an effective neck support is achieved.

Advantages and advantageous embodiments of the first aspect should be seen as advantages and advantageous embodiments of the second aspect of the invention and vice versa.

Further advantages, features and details of the invention result from the following description of a preferred exemplary embodiment and with reference to the drawings. The features and combinations of features specified previously in the description and the features and combinations of features specified in the following description of figures and/or shown in the figures alone can be used not only in the respectively specified combinations, but also in other combinations or in isolation without leaving the scope of the invention.

DETAILED DESCRIPTION OF THE DRAWINGS

Figure 1:
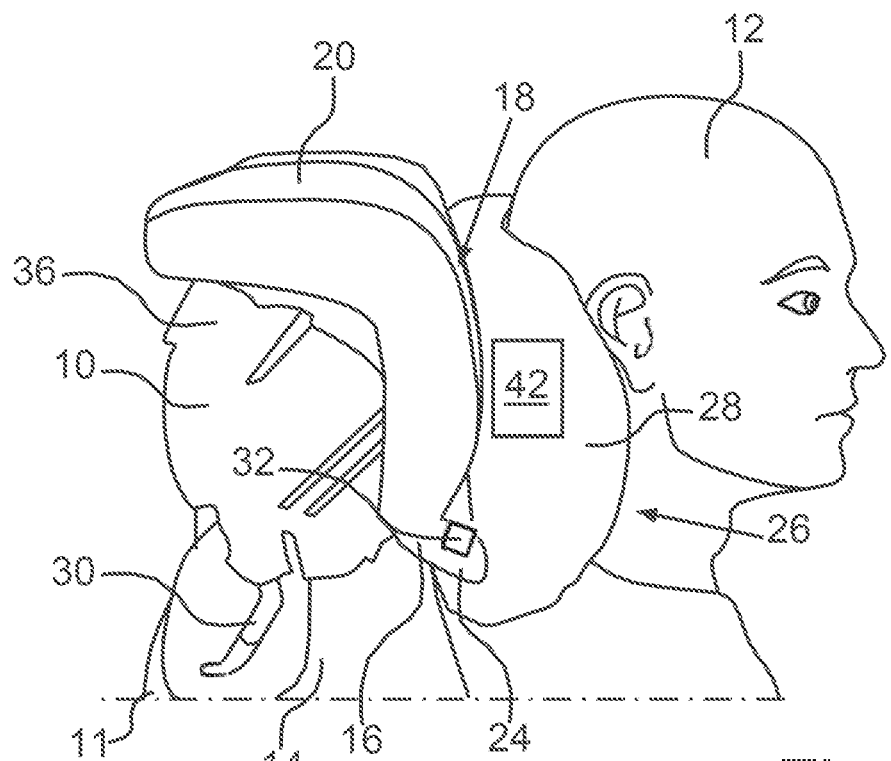
FIG. 1 shows, in a schematic perspective view, a headrest having a neck rest of which the end region is pivoted into an angled position.

FIG. 1 shows, in a schematic perspective view, a headrest 10 for a vehicle seat 11 of a motor vehicle (not shown), in particular a passenger car. The vehicle seat 11 has a headrest 10 for supporting an occupant's head 12 of a vehicle occupant. The headrest 10 is mounted on a backrest 14 of the vehicle seat 11. Headrests 10 that offer a particular comfort function additionally have a neck rest 16. The headrest 10 has a support surface 18 that is upholstered so that the headrest 10 can particularly advantageously support the occupant's head 12. For this purpose, a cushion 20 is for example provided.

Figure 2:
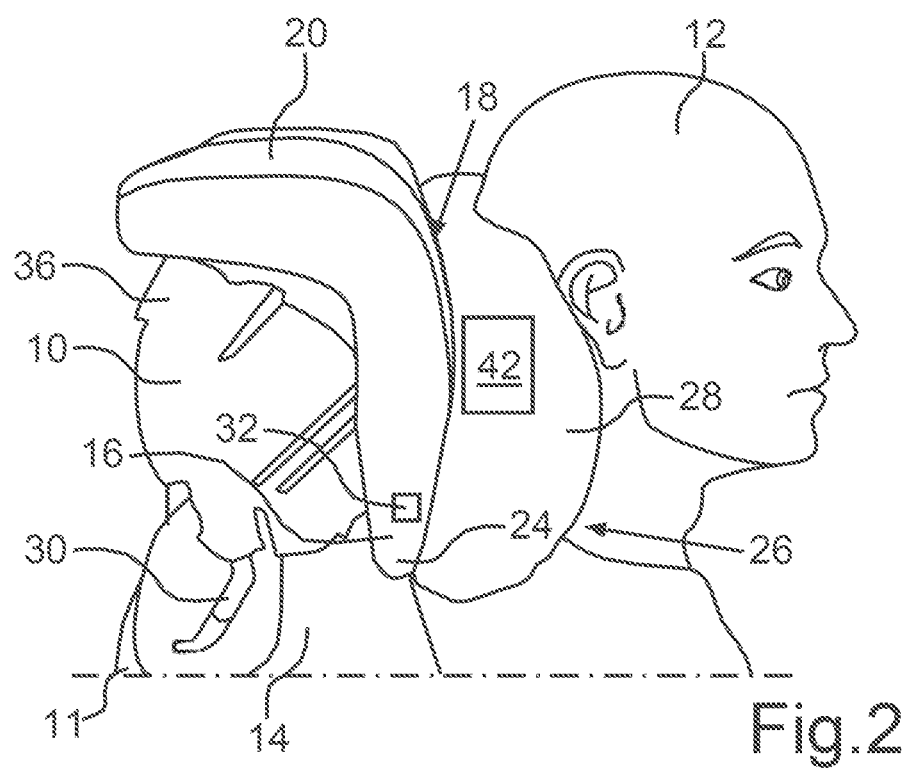
FIG. 2 shows, in a schematic perspective view, the headrest according to FIG. 1, wherein the end region is pivoted into a flat position.
Figure 3:
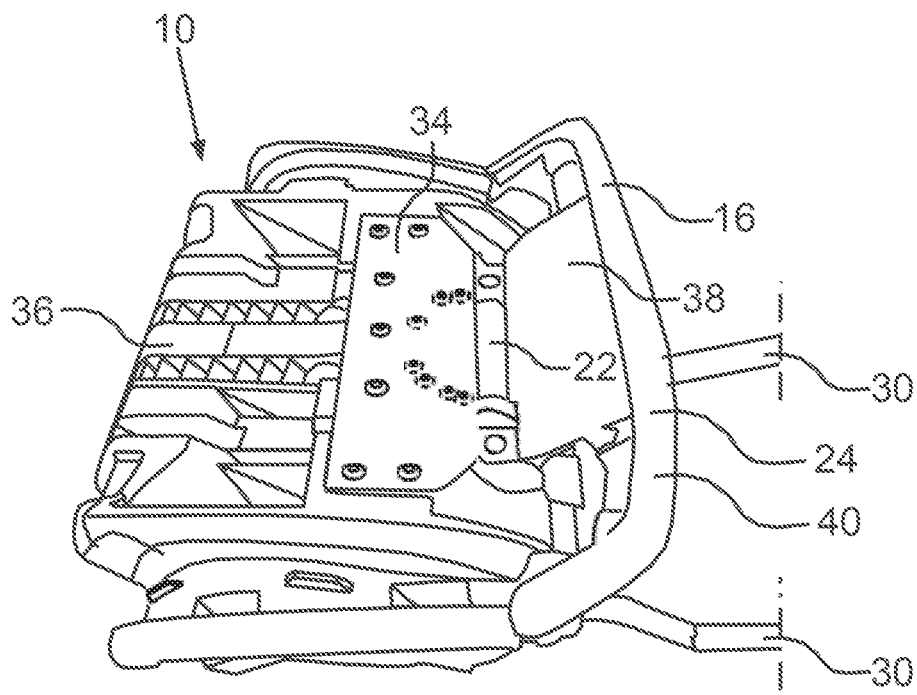
FIG. 3 shows, in a schematic perspective view, the headrest with its end region in an angled position without upholstery.
Figure 4:
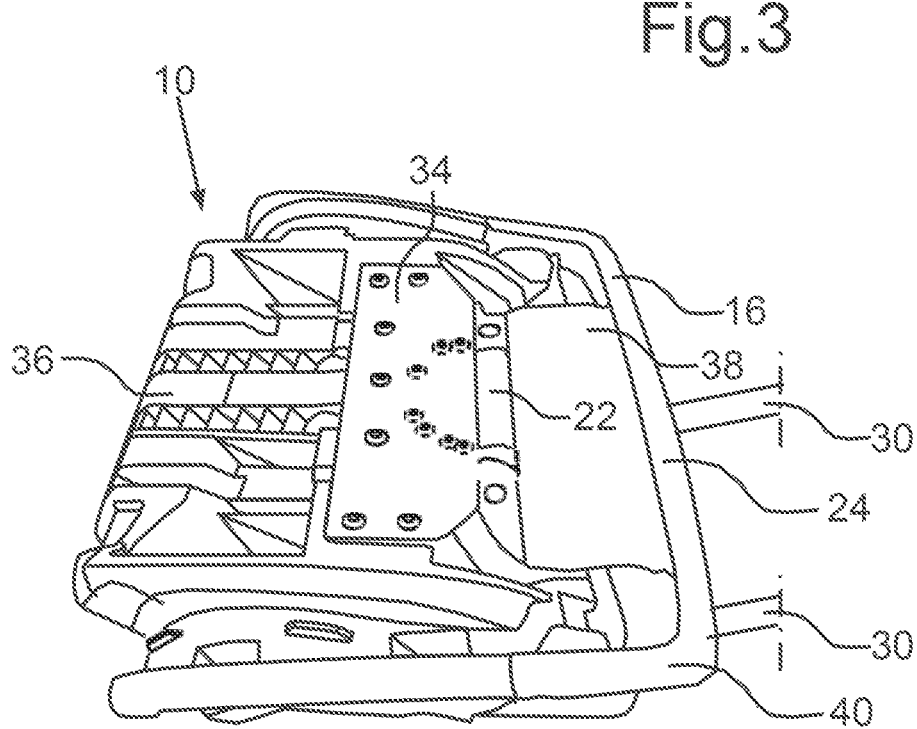
FIG. 4 shows, in a schematic perspective view, the headrest without upholstery with its end region in a flat position.

The neck rest 16 can be pivoted between a flat position shown in FIG. 2 and an angled position shown here in FIG. 1 by means of at least one friction hinge 22 shown in FIGS. 3 and 4, so that the headrest 10, and thus the vehicle seat 11, can offer particularly high comfort and particularly simple operability, and can additionally be operated safely.

An end region 24 of the neck rest 16 is a part of the support surface 18 in the flat position. In the angled position, the end region 24 of the neck rest 16 is positioned angled to the support surface 18, wherein the end region 24 is designed to support a neck region 26 or neck attached to the occupant's head 12. In an intended position of the vehicle seat 11 in the motor vehicle, the end region 24 is substantially located on the lower end of the headrest 10. The headrest 10 thus has the advantage that the neck rest 16 does not necessarily need to be pivoted into a non-usage position if it is not currently required to support the neck as it takes on the function of the support surface 18 in the flat position and thus serves as a support for the occupant's head 12 in place of the neck support.

Resistance of the friction hinge 22 is advantageously adjusted to an impact event, i.e., in particular to the acceleration, which can affect the motor vehicle or the headrest 10 or the neck rest 16. The neck rest 16 can thus pivot independently into the flat position in the event of an impact event. The motor vehicle shown and the headrest 10 shown thus respectively have the advantage that a particularly simple technical solution for pivoting the neck rest 16 can be provided by using the friction hinge 22.

Due to the design of the friction hinge 22 and the coordination of its resistance, in particular of the friction resistance when it is operated, the headrest 10 can be particularly easily operated, for example by a hand of the occupant, and the neck rest 16 can thus be pivoted. In the event of an impact, for example in the event of an accident, an independent reset of the neck rest can for example be achieved in the flat position, whereby the headrest 10 shown can be operated safely.

The headrest 10 can be used both for a vehicle seat 11 front region and also for a vehicle seat 11 in the rear region of the motor vehicle. The headrest 10 can be connected to the backrest 14 by means of fixing elements 30 and such that its height can be adjusted via the fixing elements. The headrest 10 can comprise a base element 36 or a base body in its structure, on which, for example, the friction hinge 22 and/or the cushion 20 among other things are mounted.

So the headrest 10 can be used particularly comfortably, a removable cushion element 28 is advantageously provided that can be fixed to the support surface 18 by means of a fastening element (not shown). The cushion element 28 can additionally comprise a heating element 42 that can be used to heat and/or to cool the cushion element 28 and thus to heat and/or cool the occupant's head 12 or the neck region 26.

Due to an interaction of the cushion element 28 with the end region 24 when pivoting the neck rest 16, the heating element 42 can be particularly advantageously positioned on the neck region 26 of the vehicle occupant, whereby a heat transfer into the neck region 26 and/or shoulder region of the vehicle occupant can be achieved in a particularly advantageous manner, whereby the headrest 10 can be used particularly comfortably.

The headrest 10 can further have a massage device 32 for particularly comfortable use and relaxation moments of the vehicle occupant, the massage device being able to comprise both a vibrating element and/or a pneumatic actuator to generate a massage effect for a vehicle occupant. The massage device 32 is in particular arranged on the neck rest 16, and there on the end region 24, whereby the massage device 32 can be particularly advantageously positioned on the neck region 26 of the vehicle occupant, as a massage can generally lead to more relaxation there than directly on the occupant's head 12.

FIG. 2 shows the headrest 10 according to FIG. 1, likewise in a schematic perspective view, wherein unlike in FIG. 1, the neck rest 16 is not located in the angled position, but in the flat position, whereby it thus forms a part of the support surface 18.

FIG. 3 and FIG. 4 show, likewise in a schematic perspective view, the headrest 10, now with the cushion 20 removed, whereby the friction hinge 22 can be seen particularly clearly. FIG. 3 shows the neck rest 16 in the angled position and FIG. 4 the neck rest 16 in the flat position. A first part 34 of the friction hinge 22 is fixed to the base element 36 of the headrest 10. A second part 38 of the friction hinge 22, which can be pivoted relative to the first part 34 by overcoming the friction force and thus enables the neck rest 16 to be pivoted, is fixed to the neck rest 16. The neck rest 16 has a frame element 40 that determines or forms a contour of the end region 24. The frame element 40 can advantageously be connected at least indirectly in a manner fixed against rotation or fixed in place to the second part 38 of the friction hinge 22, whereby the frame element 40 can particularly advantageously be designed as a grip for pivoting the neck rest 16.

Figure 5:
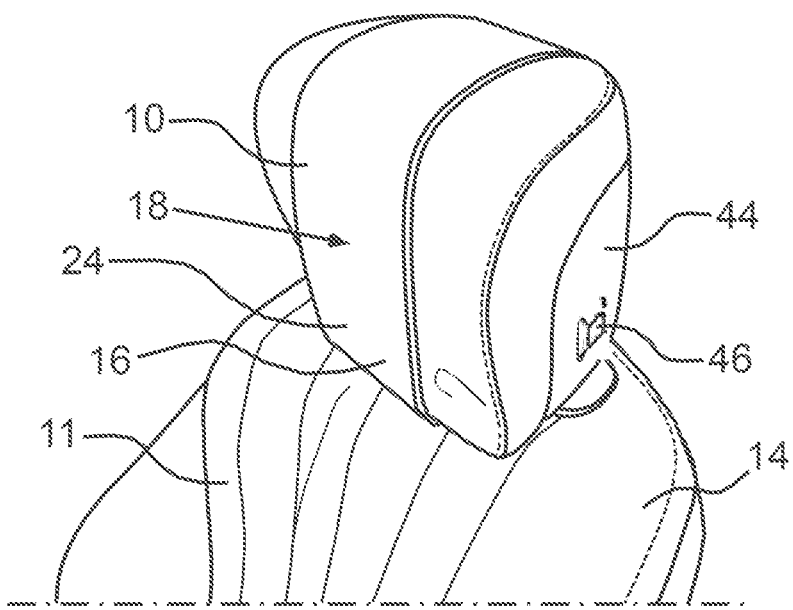
FIG. 5 shows, in a schematic perspective view, the headrest with side panelling with its end region in a flat position.
Figure 6:
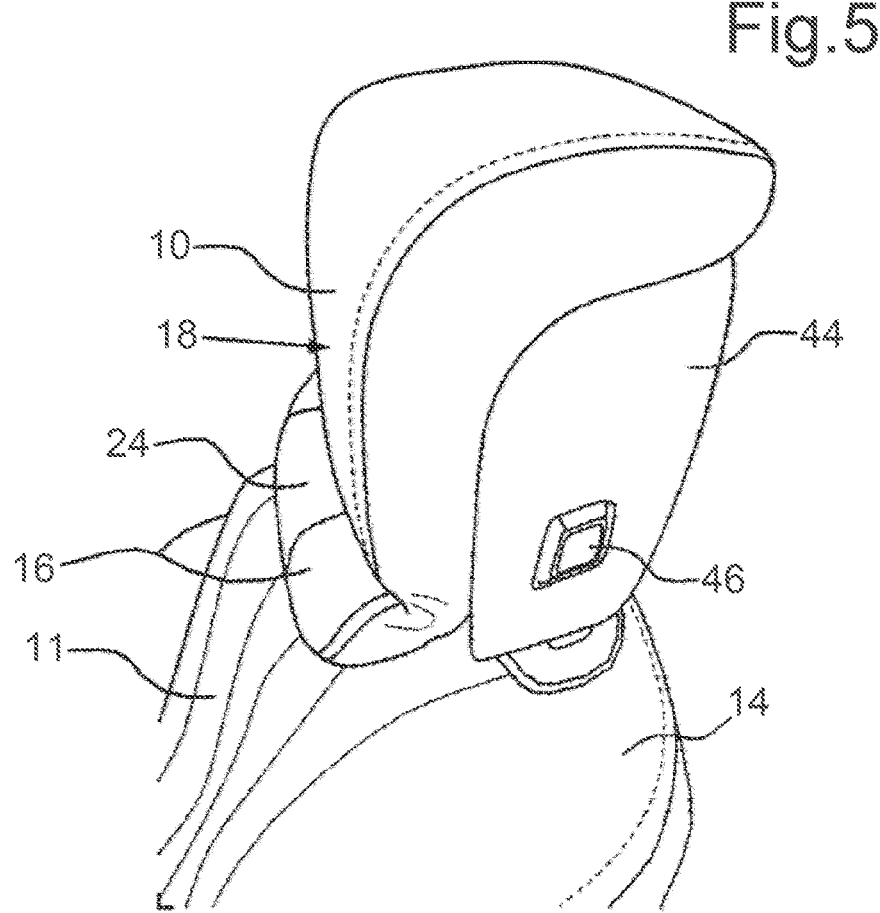
FIG. 6 shows, in a schematic perspective view, the headrest according to FIG. 5 in an angled position.

FIG. 5 shows the headrest 10 in the flat position in a further schematic perspective view. FIG. 6 shows the headrest 10 in the angled position in a further schematic perspective view. FIG. 5 and FIG. 6 both show the headrest 10 according to FIG. 1 to 4, wherein the cushion element 28 is removed or cannot be provided. Both FIGS. 5 and 6 show side panelling 44, however, which clads the base element 36 and is normally mounted for operating the vehicle seat 11. FIGS. 5 and 6 additionally show a side element 46 which can serve as an operating element, for example for height adjustment of the headrest 10 and/or as a mounting element, for example for the fastening element of the cushion element 28.

A comfortable and effective neck support can be achieved by the headrest 10 shown and the presented motor vehicle. The neck rest is additionally advantageous as in the event of an accident it is possible for the end region 24 to pivot back independently. The headrest 10 can be designed such that it has an identical external appearance in comparison with a headrest without a neck rest 16. The heating effect of the heating element 42 in the neck region can be increased in a particularly advantageous manner via the pivotable end region 24. A targeted neck massage is further possible via the massage device 32. The headrest 10 can thus be operated particularly easily and can be used particularly comfortably.

The invention claimed is:

1. A headrest (10) for a vehicle seat (11), comprising:
   a cushion (20), wherein the cushion (20) has an upholstered support surface (18) for supporting an occupant's head (12); and
   a neck rest (16) disposed within the cushion (20);
   wherein the neck rest (16) is pivotable between a flat position and an angled position by a friction hinge (22), wherein an end region (24) of the neck rest (16) seamlessly forms a part of the upholstered support surface (18) of the cushion (20) in the flat position, and wherein the end region (24) of the neck rest (16) stands angled in relation to the upholstered support surface (18) of the cushion (20) within the cushion (20) in the angled position and delimits a bottom of a reduced upholstered support surface (18) of the cushion (20) which results from the angled position of the end region (24) of the neck rest (16) within the cushion (20).

2. The headrest (10) according to claim 1, wherein a resistance of the friction hinge (22) is adjusted to an impact event such that the neck rest (16) independently pivots into the flat position during the impact event.

3. The headrest (10) according to claim 1, wherein the neck rest (16) has a frame element (40) that forms a contour of the end region (24).

4. The headrest (10) according to claim 1, wherein the headrest (16) has a massage device (32).

5. The headrest (10) according to claim 4, wherein the massage device (32) has a vibrating element.

6. The headrest (10) according to claim 4, wherein the massage device (32) has a pneumatic actuator.

7. The headrest (10) according to claim 4, wherein the massage device (23) is disposed on the neck rest (16).

8. The headrest (10) according to claim 1, further comprising a removable cushion element (28) that is fixable to the upholstered support surface (18) by a fastening element.

9. The headrest (10) according to claim 8, wherein the removable cushion element (28) has a heating element (42).

10. A motor vehicle, comprising:
    a vehicle seat (11) that has the headrest (10) according to claim 1.

* * * * *